United States Patent
Ridealgh

(10) Patent No.: US 12,527,313 B2
(45) Date of Patent: Jan. 20, 2026

(54) GLAZING FOR MINIMIZING BIRD COLLISIONS

(71) Applicant: Pilkington Group Limited, Lancashire (GB)

(72) Inventor: John Andrew Ridealgh, Northwich (GB)

(73) Assignee: Pilkington Group Limited, Lathom (GB)

( * ) Notice: Subject to any disclaimer, the term of this patent is extended or adjusted under 35 U.S.C. 154(b) by 404 days.

(21) Appl. No.: 18/042,313

(22) PCT Filed: Aug. 20, 2021

(86) PCT No.: PCT/GB2021/052164
§ 371 (c)(1),
(2) Date: Feb. 21, 2023

(87) PCT Pub. No.: WO2022/043665
PCT Pub. Date: Mar. 3, 2022

(65) Prior Publication Data
US 2025/0275529 A1    Sep. 4, 2025

(30) Foreign Application Priority Data
Aug. 26, 2020 (GB) ................................ 2013360

(51) Int. Cl.
*C03C 17/34* (2006.01)
*A01M 29/08* (2011.01)
*G02B 5/28* (2006.01)

(52) U.S. Cl.
CPC ......... *A01M 29/08* (2013.01); *C03C 17/3417* (2013.01); *C03C 17/3435* (2013.01); *G02B 5/283* (2013.01); *G02B 5/285* (2013.01); *G02B 5/286* (2013.01); *Y10T 428/24537* (2015.01); *Y10T 428/24545* (2015.01)

(58) Field of Classification Search
CPC ......... B32B 17/10201–10229; C03C 17/3417; C03C 17/3423; C03C 17/3429;
(Continued)

(56) References Cited

U.S. PATENT DOCUMENTS

2014/0370208 A1* 12/2014 Walp ................. C03C 17/36
                                                        65/56
2015/0345206 A1    12/2015 Vikor et al.
(Continued)

FOREIGN PATENT DOCUMENTS

WO      2020035818 A1    2/2020
WO   WO-2020065664 A1 *  4/2020 ............... C03C 8/04

OTHER PUBLICATIONS

European Patent Office, International Search Report and Written Opinion in Application No. PCT/GB2021/052164, dated Nov. 25, 2021, 9 pages, Rijswijk, Netherlands.
(Continued)

*Primary Examiner* — Z. Jim Yang
(74) *Attorney, Agent, or Firm* — Marshall & Melhorn, LLC

(57) ABSTRACT

A glazing for minimising bird collisions with glazings has at least one substrate including a first major surface. The first major surface includes one or more first regions and one or more second regions, and the one or more first regions are coated with a UV reflective coating of a thickness of at least 5 nm. The one or more second regions are at least partially coated with the UV reflective coating at a thickness of less than 5 nm, or the UV reflective coating is completely absent in the one or more second regions. The UV reflective coating is coated with a protective coating, with the protective coating being based on an oxide or nitride of a metalloid or an oxide or nitride of a metal.

20 Claims, 1 Drawing Sheet

Figure 1:
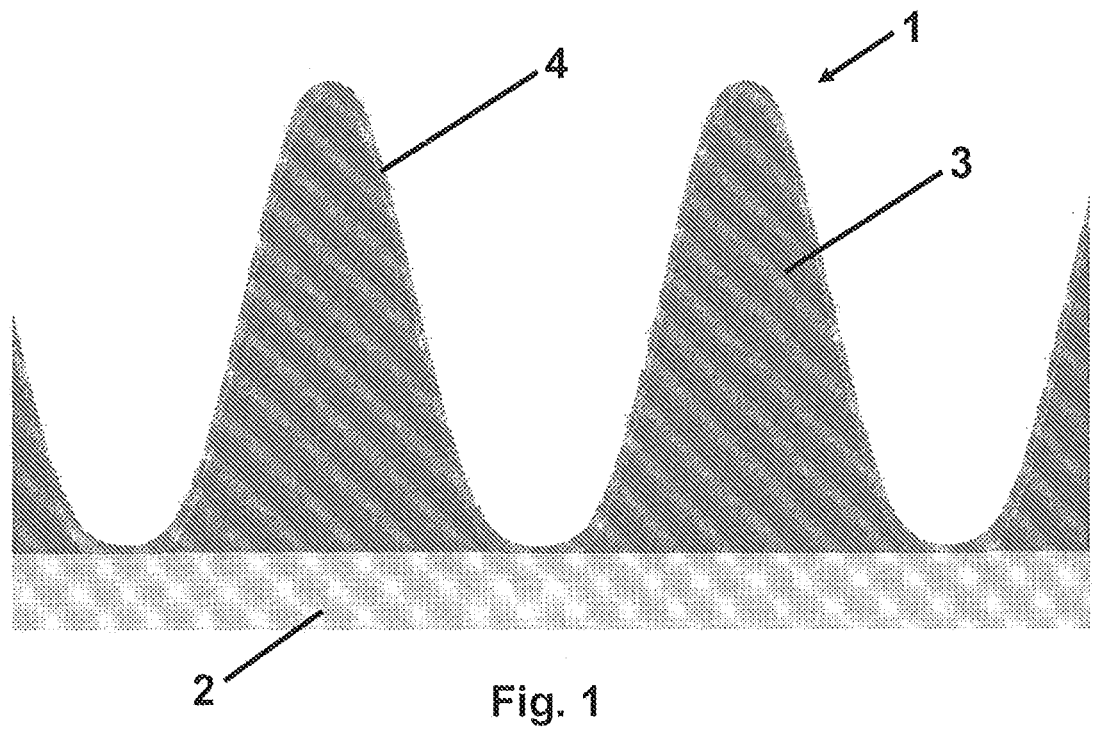

(58) Field of Classification Search
CPC .............. C03C 17/3435; C03C 17/366; C03C 17/3681; C03C 2217/21–216; C03C 2217/218; C03C 2217/22; C03C 2217/228–244; C03C 2217/73; C03C 2217/734; C03C 2217/74; C03C 2217/77; G02B 5/281; G02B 5/282; G02B 5/283; G02B 5/285; G02B 5/286
See application file for complete search history.

(56) References Cited

U.S. PATENT DOCUMENTS

| | | | |
|---|---|---|---|
| 2016/0041319 A1* | 2/2016 | Hicks | B44F 1/02 359/359 |
| 2016/0137850 A1* | 5/2016 | Ridealgh | A01M 29/08 427/248.1 |
| 2017/0020123 A1* | 1/2017 | Arnold | B23K 26/0006 |
| 2017/0208796 A1* | 7/2017 | Thompson | C03C 17/3417 |
| 2017/0217831 A1* | 8/2017 | Hart | C03C 17/2453 |
| 2018/0173071 A1* | 6/2018 | Mathew | C03C 17/3411 |
| 2018/0222793 A1* | 8/2018 | Ridealgh | C03C 17/3417 |
| 2019/0084874 A1* | 3/2019 | Weng | C03C 17/3618 |
| 2019/0294016 A1 | 9/2019 | Mathew et al. | |
| 2020/0174333 A1 | 6/2020 | Matthew et al. | |
| 2022/0026611 A1* | 1/2022 | Wuillaume | E06B 3/6715 |

OTHER PUBLICATIONS

United Kingdom Intellectual Property Office, Search Report in Application No. GB2013360.9 dated Feb. 8, 2021, 2 pages.

* cited by examiner

GLAZING FOR MINIMIZING BIRD COLLISIONS

The present invention relates to a glazing for minimising bird collisions with glazings. The invention further relates to a method of manufacturing such a glazing.

Bird deaths due to window strikes represent one of the greatest threats to avian mortality next to habitat destruction. Due to the reflective and transparent characteristics of glass, the glass may not be perceived as a barrier to the bird. Specifically, the bird may not recognize that reflections of, for example, the sky, other buildings, vegetation and even open space, are false. As a result, the bird may fly into the glass. Typically, the glass is a glazing in a building, for example, a window, but could equally be a glass balcony, a glazed door, etc.

Many millions of birds die each year from collisions with glass. While songbirds are most at risk, nearly 300 species have been reported as collision victims, including hummingbirds, woodpeckers, kingfishers, waders and birds of prey. It is likely that these numbers will grow as advances in glass technology and production make it possible to construct buildings with all-glass curtain walls, in addition to the general increase in the amount of glass being used in architecture.

The reduction of bird strikes can be achieved in a number of ways. A common approach involves creating a visual signal that alerts the birds to the presence of the glass. Known techniques include the use of fritting, i.e. the placement of ceramic lines or dots on glass, the use of screens, latticework, or grilles. More recently however, it has been shown that the use of ultraviolet (UV) patterns on glass may help birds to detect the presence of the glass.

Many families of birds are tetrachromatic, possessing four types of cone cells each with a distinctive maximal absorption peak. In some bird families, the maximal absorption peak of the cone cell responsible for the shortest wavelength extends to the UV range, making them UV-sensitive. As such, many birds are able to see into the UV spectrum, in particular in the range 300 to 400 nm, a range largely invisible to humans.

Consequently, UV reflective coated glazings for minimising bird collisions are known in the art. Such glazings may utilise a patterned UV reflective coating which is visible to birds but substantially invisible or barely visible to the human eye. For example, in WO 2014/188196 A1 a glazing is described in which a glass substrate is provided with an antireflection layer, such as that found on the Pilkington Optiview™ coated glass product, and a striped $TiO_2$ coating is formed thereover by $TiO_2$ sputter deposition through a mask in contact with the glass substrate.

Another example can be found in WO 2016198901 A1 which describes a glazing with a UV reflectance coating deposited in a patterned arrangement comprised of a plurality of stripes. Each stripe is provided with "soft" rather than "hard" or sharp edges that render the patterned arrangement less perceptible to humans when viewed up close, while retaining the effectiveness of the glazing in minimising bird collisions.

However, a disadvantage of the aforementioned glazings is that the patterned UV reflective coating may not exhibit the desired chemical and mechanical durability. Ideally, the coating should be durable for at least 20 years on the external surface of a glazing. Although UV reflective coatings may be used on inner surfaces, placement of the coating on an inner surface dramatically reduces performance.

Toughening the coating creates a very durable product that passes all standard durability tests. However, in its as-deposited state the coating can fail chemo-mechanical durability tests such as an Oil Rub Test that simulates the influence of cutting oils. Not all glazing installations require toughening so it would be practical and cost effective to provide a glazing that can be utilised in an as-deposited state if required. Therefore it would be advantageous to improve the durability of glazings with UV reflective coatings.

According to the first aspect of the present invention there is provided a glazing for minimising bird collisions with glazings, wherein the glazing comprises:

at least one substrate comprising a first major surface,
    wherein the first major surface comprises one or more first regions and one or more second regions,
    wherein the one or more first regions are coated with a UV reflective coating and the UV reflective coating has a thickness of at least 5 nm,
    wherein the one or more second regions are at least partially coated with the UV reflective coating and the UV reflective coating has a thickness of less than 5 nm or wherein the UV reflective coating is completely absent in the one or more second regions,
    wherein the UV reflective coating is coated with a protective coating,
    wherein the protective coating is based on an oxide or nitride of a metalloid or an oxide or nitride of a metal.

Surprisingly it has been found that the glazing of the first aspect is particularly durable in chemical or mechanical durability tests. Furthermore, this durability is afforded without detrimental effects on the optical properties of the glazing, e.g. the ability of the glazing to minimise bird collisions.

In the context of the present invention, where a layer or coating is said to be "based on" a particular material or materials, this means that the layer or coating predominantly consists of the corresponding said material or materials, which means typically that it comprises at least about 50 at. % of said material or materials.

In the following discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention. Typically, when referring to compositions, a composition consisting essentially of a set of components will comprise less than 5% by weight, typically less than 3% by weight, more typically less than 1% by weight of non-specified components.

The term "consisting of" or "consists of" means including the components specified but excluding other components.

Whenever appropriate, depending upon the context, the use of the term "comprises" or "comprising" may also be taken to include the meaning "consists essentially of" or "consisting essentially of", and also may also be taken to include the meaning "consists of" or "consisting of".

References herein such as "in the range x to y" are meant to include the interpretation "from x to y" and so include the values x and y.

In the context of the present invention a transparent material is a material that is capable of transmitting visible light so that objects or images situated beyond or behind said material can be distinctly seen through said material.

In the context of the present invention the "thickness" of a layer (or coating) is, for any given location at a surface of the layer, represented by the distance through the layer, in the direction of the smallest dimension of the layer, from said location at a surface of the layer to a location at an opposing surface of said layer.

Preferably, any regions of the first major surface where the UV reflective coating is absent are coated with the protective coating. Preferably the protective coating directly contacts any regions of the first major surface where the UV reflective coating is absent (i.e. there are no intervening layers between the first major surface of the substrate and the protective coating). In an alternative embodiment the protective coating may indirectly contact any regions of the first major surface where the UV reflective coating is absent (i.e. there is at least one intervening layer between the first major surface of the substrate and the protective coating). Said at least one intervening layer may be an antireflection layer, preferably as described below.

Preferably the protective coating is not overcoated i.e. the protective coating, where present, is the outermost coating.

Preferably the protective coating directly contacts the UV reflective coating (i.e. there are no intervening layers between the UV reflective coating and the protective coating). The UV reflective coating may directly contact the first major surface of the substrate. In an alternative embodiment an antireflection layer may be located between the UV reflective coating and the first major surface of the substrate. In addition, or alternatively, an antireflection layer may be located on an opposing major surface of the substrate.

Preferably, the one or more second regions are at least partially coated with the UV reflective coating and the UV reflective coating has a thickness of less than 4.7 nm, more preferably less than 4 nm, even more preferably less than 3 nm, even more preferably less than 2 nm. It is generally accepted that a colour difference, delta E*, of <2 would not be noticeable to an unexperienced observer (see Mokrzycki, Wojciech & Tatol, Maciej. (2011); Color difference Delta E—A survey; Machine Graphics and Vision; 20; 383-411; page 15, section 6.2). In the case of a TiO$_2$ coating on a float glass pane, the delta E* between coated and uncoated sections reaches 2 at a TiO$_2$ coating thickness of 4.7 nm.

The protective coating is preferably based on a material that is different to the material that the UV reflective coating is based on. The protective coating may be based on silicon dioxide, zirconium oxide, silicon nitride and/or nickel chromium oxide. The protective coating may be based on a material that is doped. Preferably the protective coating is based on silicon dioxide and/or silicon nitride, more preferably silicon dioxide, even more preferably silicon dioxide doped or mixed with aluminium. Preferably the silicon dioxide doped or mixed with aluminium comprises up to 30 wt % aluminium based on the total silicon plus aluminium content, more preferably 1 to 20 wt % aluminium, even more preferably 3 to 15 wt % aluminium, most preferably 5 to 10 wt % aluminium. Preferably the silicon dioxide doped or mixed with aluminium has been reactively sputtered from a mixed silicon/aluminium metal target comprising up to 30% aluminium, more preferably 1 to 20 wt % aluminium, even more preferably 3 to 15 wt % aluminium, most preferably 5 to 10 wt % aluminium. Silicon dioxide doped or mixed with aluminium provides advantages in terms of durability at a range of thicknesses, ease of deposition and no adverse effects on optical properties, in particular the contrast in the UV range between regions with the UV reflective coating and those without (or less than 5 nm thickness).

Preferably the protective coating is based on a material that is stoichiometric or super-stoichiometric.

Preferably the protective coating has a thickness of at least 0.5 nm, more preferably at least 1 nm, even more preferably at least 1.5 nm, most preferably at least 2 nm, but preferably at most 15 nm, more preferably at most 10 nm, even more preferably at most 5 nm, most preferably at most 4 nm. These preferred thicknesses of the protective coating allow for minimal deterioration of the optical performance of the UV reflective coating in order to achieve the desired optical properties.

Preferably the protective coating has a substantially uniform thickness. Preferably the thickness of the protective coating does not differ by more than 10 nm, more preferably by more than 5 nm, even more preferably by more than 3 nm, most preferably by more than 1.5 nm, over the entirety of the protective coating.

The UV reflective coating may be based on an oxide and/or nitride of one or more of titanium, vanadium, chromium, zirconium, niobium, tantalum, hafnium and tungsten. Preferably the UV reflective coating is based on titanium dioxide.

Preferably the UV reflective coating defines a patterned arrangement on the first major surface. Preferably the patterned arrangement comprises a plurality of stripes. Preferably at least one, more preferably each, of the stripes has a thickness that changes by 10 nm or less over every 1 mm in width, more preferably by 6 nm or less over every 1 mm, even more preferably by 3 nm or less over every 1 mm, and even more preferably, each of the stripes has a thickness that changes by 1.5 nm or less over every 1 mm in width. At a point n, the thickness change per mm width=(thickness at point n minus thickness at point n−1)/(position at point n minus position at point n−1). In this manner, each stripe is provided with "soft" rather than "hard" or sharp edges that render the patterned arrangement less perceptible to humans when viewed up close, while retaining the effectiveness of the glazing in minimising or preventing bird collisions.

Preferably the plurality of stripes are not linked or touching one another; i.e. preferably the stripes are not interconnected. However, alternatively the thickness of the UV reflective coating may not drop to zero between the stripes; i.e. the stripes are interconnected. As long as there is a difference between the maximum coating thickness at each stripe and the minimum coating thickness between the stripes of at least 10 nm, both arrangements are considered to define a "plurality of stripes" as used herein. Preferably, the stripes are equidistantly spaced apart from one another.

Preferably the UV reflective coating of the one or more first regions has a thickness of at least 10 nm, more preferably at least 20 nm, even more preferably at least 30 nm, most preferably at least 35 nm, but preferably at most 100 nm, more preferably at most 50 nm, even more preferably at most 45 nm, most preferably at most 40 nm. Reference herein to the thickness of the UV reflective coating refers to the difference between a maximum UV reflective coating thickness of the one or more first regions and an adjacent minimum UV reflective coating thickness. For example, the thickness of the UV reflective coating of the one or more first regions may be the difference between a maximum UV reflective coating thickness at a stripe of UV reflective coating and the minimum coating thickness between the stripe and an adjacent stripe.

The at least one substrate may be transparent, translucent or opaque, preferably transparent. The at least one substrate may be a glass or polymeric substrate, preferably a glass substrate. The polymeric substrate may be a polymeric sheet or film. Preferably the at least one substrate is at least one transparent glass substrate. The transparent glass substrate may be clear or tinted. Preferably the transparent glass substrate is a clear transparent glass substrate. The transparent glass substrate may be a metal oxide-based glass pane. The glass pane may be a clear or tinted float glass pane. Preferably the glass pane is a clear glass pane. A typical soda-lime-silicate glass composition is (by weight), $SiO_2$ 69-74%; $Al_2O_3$ 0-3%; $Na_2O$ 10-16%; $K_2O$ 0-5%; $MgO$ 0-6%; $CaO$ 5-14%; $SO_3$ 0-2% and $Fe_2O_3$ 0.005-2%. The glass composition may also contain other additives, for example, refining aids, which would normally be present in an amount of up to 2%. By clear float glass, it is meant a glass having a composition as defined in BS EN 572-1 and BS EN 572-2 (2004). For clear float glass, the $Fe_2O_3$ level by weight is typically 0.11%. Float glass with an $Fe_2O_3$ content less than about 0.05% by weight is typically referred to as low iron float glass. Such glass usually has the same basic composition of the other component oxides i.e. low iron float glass is also a soda-lime-silicate glass, as is clear float glass. Typically tinted float glass has at least 0.5% by weight $Fe_2O_3$, e.g. 1.0% by weight $Fe_2O_3$. Alternatively the glass pane is a borosilicate-based glass pane, an alkali-aluminosilicate-based glass pane, or an aluminium oxide-based crystal glass pane.

The UV reflective coating and/or the protective coating may have been deposited via sputtering, chemical vapour deposition (CVD), sol-gel, evaporation, electroplating/oxidation, atomic layer deposition, pulsed laser deposition, other thin film deposition techniques, or various printing techniques, preferably via sputtering.

Preferably, the patterned arrangement is a regular pattern. Preferably, the patterned arrangement comprises a repeating pattern.

Preferably, the UV reflective coating directly or indirectly covers at least 20% of the first major surface, more preferably at least 25% of the first major surface.

In a preferred arrangement, each stripe has a width in the range of 1 cm to 10 cm, more preferably in the range of 3 cm to 7 cm. The stripe width is defined as the full-width at half-maximum thickness; that is, the stripe width is the width from the point on one side of the point of maximum thickness where the thickness has dropped to half of that maximum thickness to the point on the other side of the point of maximum thickness where the thickness has dropped to half of the maximum thickness. Preferably the stripes are spaced at a pitch in the range of 1 cm to 10 cm; that is, the spacing between the start of one stripe and the start of the adjacent stripe is in the range of 1 cm to 10 cm.

Preferably, the first major surface of the at least one substrate is exterior facing when in use. This surface is often referred to as "surface #1" of the glazing.

For a broad spectral response the antireflection layer may fall into one of three categories, as follows:
1) Single layer coatings of porous low index materials such as porous silica—which give an intermediate effective refractive index between glass and air, so reducing the reflectance at the interfaces;
2) Three-layer medium/high/low refractive index combinations. An example of such a combination is Glass/46 nm $ZnSnO_x$/93 nm $TiO_2$/75 nm $SiO_2$; and
3) Four layer high/low/high/low refractive index combinations such as the "Pilkington Optiview™" coated glass (nominally Glass/12 nm $SnO_x$/25 nm $SiO_2$/110 nm $SnO_x$/90 nm $SiO_2$).

All of these categories are considered to be equally valid for the purposes of the present invention, as are other variations based on the same principles.

Preferably, the antireflection layer comprises a plurality of layers. Preferably, said layers comprise a first layer comprising tin oxide ($SnO_2$). Preferably, the first layer, most preferably $SnO_2$, has a geometric thickness of between substantially 5 nm and 100 nm, preferably between 10 nm and 50 nm, preferably between 10 nm and 20 nm, most preferably substantially 12 nm.

Preferably, a second layer is provided preferably comprising silicon dioxide ($SiO_2$), preferably the $SiO_2$ has a geometric thickness of between substantially 5 nm and 100 nm, preferably between 10 nm and 50 nm, preferably between 15 nm and 30 nm, most preferably substantially 25 nm. Most preferably, the second layer is deposited over the first layer.

Preferably, a third layer is provided preferably comprising fluorine doped tin oxide ($F:SnO_2$) preferably the $F:SnO_2$ had a geometric thickness of between substantially 5 nm and 200 nm, preferably between 50 nm and 150 nm, preferably between 100 nm and 120 nm, most preferably substantially 110 nm. Most preferably, the third layer is deposited over the second layer.

Preferably, a fourth layer is provided preferably comprising $SiO_2$. Preferably, the $SiO_2$ has a geometric thickness of between substantially 5 nm and 200 nm, preferably between 50 nm and 150 nm, preferably between 80 nm and 100 nm, most preferably substantially 90 nm. Most preferably, the fourth layer is deposited over the third layer. Such antireflection layer comprising said layers first to fourth respectively, is referred to as an Optiview coating.

In a preferred embodiment of the present invention there is provided a glazing for minimising bird collisions with glazings, wherein the glazing comprises:
at least one glass substrate comprising a first major surface,
wherein the first major surface comprises one or more first regions and one or more second regions,
wherein the one or more first regions are coated with a UV reflective coating and the UV reflective coating has a thickness of at least 10 nm but at most 50 nm,
wherein the one or more second regions are at least partially coated with the UV reflective coating and the UV reflective coating has a thickness of less than 4.7 nm, or
wherein the UV reflective coating is completely absent in the one or more second regions,
wherein the UV reflective coating is coated with a protective coating,
wherein the protective coating directly contacts the UV reflective coating,
wherein, if present, any regions of the first major surface where the UV reflective coating is absent are coated with the protective coating and the protective coating directly contacts the regions of the first major surface where the UV reflective coating is absent,
wherein the protective coating is based on an oxide of silicon, and
wherein the UV reflective coating is based on titanium dioxide.

More preferably for the embodiment of the preceding paragraph the UV reflective coating defines a patterned arrangement on the first major surface, wherein the patterned arrangement comprises a plurality of stripes.

The invention is not limited to the substrate being a glazing in a building. For example, the substrate may be a door, a balcony, a spandrel.

In certain preferred embodiments the glazing comprises a further coating, preferably a solar control coating, more preferably a low-E coating.

In some preferred embodiments the glazing may form an insulated glazing unit wherein the at least one substrate is held in a spaced apart relationship with a second substrate. Various insulated glazing unit configurations are suitable for use in accordance with the invention, such as those described in WO 2014/188196 A1. Preferably, the first major surface of the at least one substrate is exterior facing and facing away from the second substrate when in use. This surface is often referred to as "surface #1" of the insulated glazing unit. Alternatively, the first major surface of the at least one substrate is interior facing and facing towards the second substrate when in use. This surface is often referred to as "surface #2" of the insulated glazing unit. The second substrate has two opposing major surfaces, "surface #3" and "surface #4", where in use surface #3 faces towards the at least one substrate.

Preferably, the antireflection layer is provided on surface #1 of the insulated glazing unit. Preferably, a second antireflection layer is provided on the insulated glazing unit, preferably on surface #2. Most preferably, the UV reflective coating is provided on top of the antireflection layer on the first surface and/or the second surface. The second antireflection layer may be provided on surface #3 or surface #4 of the unit.

In some preferred embodiments the glazing may form an insulated glazing unit wherein the at least one substrate is held in a spaced apart relationship with second and third substrates.

According to the second aspect of the present invention there is provided the use of the protective coating described in the first aspect to improve the durability of the glazing according to the first aspect.

Any feature set out above in relation to the first aspect of the present invention may also be utilised in relation to any other aspects of the present invention.

Any invention described herein may be combined with any feature of any other invention described herein mutatis mutandis.

It will be appreciated that optional features applicable to one aspect of the invention can be used in any combination, and in any number. Moreover, they can also be used with any of the other aspects of the invention in any combination and in any number. This includes, but is not limited to, the dependent claims from any claim being used as dependent claims for any other claim in the claims of this application.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

Figure 2:
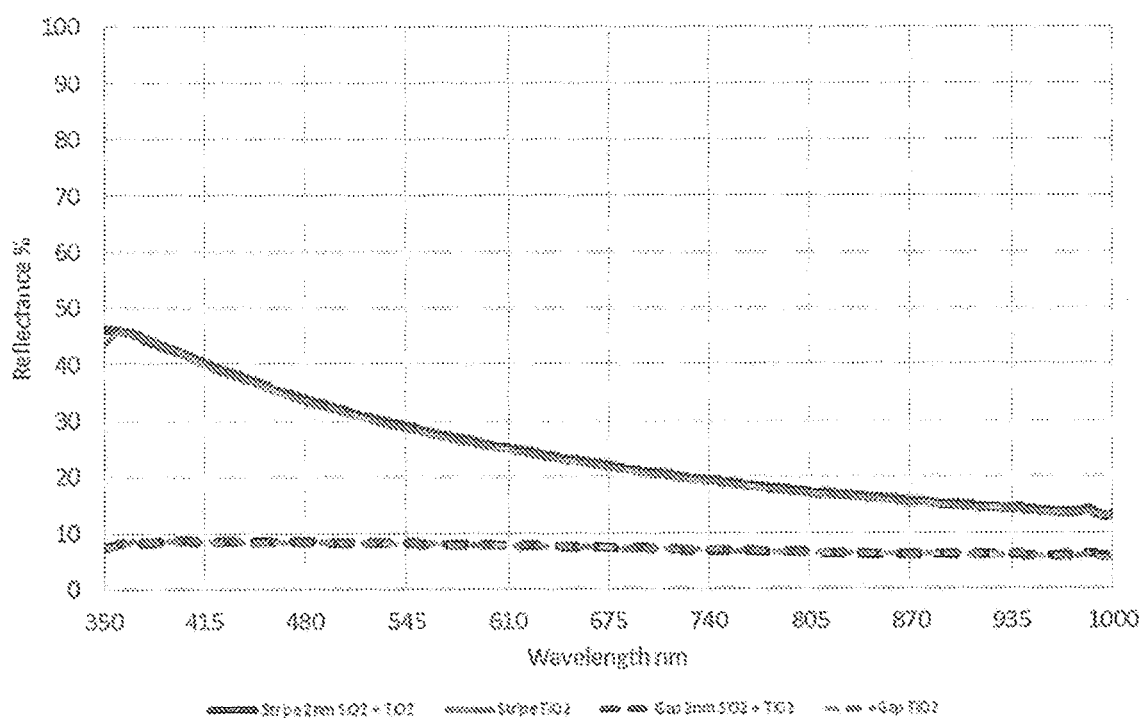

The invention will now be further described by way of the following specific embodiments, which are given by way of illustration and not of limitation, with reference to the accompanying drawings in which:

FIG. 1 shows a schematic cross-sectional view of a glazing in accordance with the present invention; and FIG. 2 shows a graph of wavelength vs % reflectance for a $TiO_2$ coated glazing with and without a protective coating of $SiO_2$: 9 wt % Al based on the total silicon plus aluminium content.

FIG. 1 shows a schematic cross-sectional view of a glazing 1 in accordance with the present invention. Glazing 1 comprises a clear float glass ply 2 (e.g. with a thickness of 4 mm, a length of 100 cm and a width of 65 cm) coated with "soft-edged" $TiO_2$ stripes 3 with a bell-shaped thickness profile in which the thickness of the stripes 3 is 36 nm at the centre of each stripe 3 and tails off to zero at each edge. The soft-edged $TiO_2$ stripes 3 are formed by sputtering through a slot shield in which the slots are e.g. 16 mm wide. Sputtering through the slot shield also results in the width of each stripe 3 being greater (e.g. a width of approximately 40 mm) than the 10 mm wide slots.

Each stripe 3 extends parallel to and along the entire length of the glass ply 2. Adjacent stripes 3 are parallel and spaced apart across the entire width of the glass ply 2 such that there is 100 mm from the centre of one stripe 3 to the centre of an adjacent stripe 3.

The $TiO_2$ stripes 3 and the surface of glass ply 2 in the gaps between the stripes 3 are coated with a 2 nm thick protective coating of $SiO_2$:Al (7-10 wt % Al based on the total silicon plus aluminium content).

FIG. 2 shows a graph of wavelength vs % reflectance for the glazing 1 shown in FIG. 1 and described above in comparison with the same glazing but with the protective coating of $SiO_2$: 9 wt % Al (based on the total silicon plus aluminium content) omitted. The graph shows that the presence of the protective coating on the $TiO_2$ stripes (see "Stripe 2 nm SiO2+TiO2" plot) results in only a tiny difference to the appearance in reflection of the stripes in comparison with the uncoated stripes (see "Stripe TiO2" plot). Likewise, the presence of the protective coating on the surface of the glass in the gaps between the stripes (see "Gap 2 nm SiO2+TiO2" plot) affords an almost identical appearance in reflection of the gaps in comparison with the uncoated gaps (see "Gap TiO2" plot).

EXAMPLES

Several examples were prepared in accordance with the glazing of FIG. 1 but varying the material of the protective coating. For each example a clear float glass ply of thickness 6 mm, length 3210 mm and width 2250 mm was coated with an ~36 nm thick UV reflective coating of $TiO_2$ using magnetron sputtering through a slot shield as mentioned above in relation to FIG. 1 and as described in WO 2016/198901.

Without further coating, one of these examples served as Comparative Example 1. Examples according to the invention were prepared by further coating the examples as described below:

A variety of experimental protective layers were deposited over the pre-prepared striped $TiO_2$ samples. Deposition was carried out using a Von Ardenne™ LS780S laboratory sputtering system using the conditions set out below in Table 1. The plant was equipped with targets of the study materials (or the metals they are derived from), mounted on 150 mm diameter circular planar magnetron sources. For reactively sputtered materials, voltage hysteresis curves were performed to obtain initial sputtering conditions and stoichiometric information. Rate runs were carried out for all materials to obtain deposition rates and check for transparency.

TABLE 1

Process conditions for deposition of the protective coating

| Deposited Material | Nominal thickness (nm) | Target Material | Speed (mm/min) | Passes | Power Supply Mode | Power (kW) | Ar (sccm) | $O_2$ (sccm) | $N_2$ (sccm) |
|---|---|---|---|---|---|---|---|---|---|
| $SiO_2$:Al | 1 | Si-10 wt % Al | 2.5 | 1 | Pulsed DC | 0.5 | 30 | 9 | |
| $SiO_2$:Al | 2 | Si-10 wt % Al | 2.3 | 1 | Pulsed DC | 1 | 30 | 19 | |
| $SiO_2$:Al | 5 | Si-10 wt % Al | 1 | 1 | Pulsed DC | 1 | 30 | 19 | |
| $SiO_2$:Al | 10 | Si-10 wt % Al | 1 | 2 | Pulsed DC | 1 | 30 | 19 | |
| $ZrO_2$ | 2 | Zr | 1 | 1 | DC | 0.8 | 30 | 13 | |
| $ZrO_2$ | 5 | Zr | 1 | 5 | DC | 0.8 | 30 | 13 | |
| $ZrO_2$ | 10 | Zr | 1.07 | 6 | DC | 0.8 | 30 | 13 | |
| $Si_3N_4$:Al | 2 | Si-10 wt % Al | 2.5 | 1 | Pulsed DC | 0.3 | 30 | | 10 |
| $Si_3N_4$:Al | 5 | Si-10 wt % Al | 2.5 | 1 | Pulsed DC | 1 | 30 | | 17 |
| $Si_3N_4$:Al | 10 | Si-10 wt % Al | 1.1 | 1 | Pulsed DC | 1 | 30 | | 17 |
| $NiCr_xO_y$ | 2 | Ni-20 wt % Cr | 2 | 1 | DC | 1 | 30 | 21 | |
| $NiCr_xO_y$ | 5 | Ni-20 wt % Cr | 1.2 | 1 | DC | 1 | 30 | 21 | |
| $NiCr_xO_y$ | 10 | Ni-20 wt % Cr | 1.21 | 2 | DC | 1 | 30 | 21 | |
| $TiO_2$ | 2 | Ti | 0.85 | 2 | Pulsed DC | 1 | 30 | 10 | |
| $TiO_2$ | 5 | Ti | 1.35 | 8 | Pulsed DC | 1 | 30 | 10 | |
| $TiO_2$ | 10 | Ti | 1.35 | 16 | Pulsed DC | 1 | 30 | 10 | |

Accordingly, Examples with protective coatings of $SiO_2$:Al, $ZrO_2$, $Si_3N_4$:Al, $NiCr_xO_y$, and $TiO_2$ of varying thicknesses as shown in Table 2 below were obtained. These Examples and Comparative Example 1 were tested for their mechanical durability in an oil rub test.

An oil rub test serves to simulate the influence of cutting oils used for cutting glass substrates on the mechanical robustness of a coating. Coated glass substrates that do not withstand an oil rub test are difficult to process and are unsuitable for most practical applications. The examples were rubbed using a felt pad with an area 1.2×1.2 cm soaked in microscope oil of refractive index 1.52 (1.515 to 1.517). The examples were subjected to 500 cycles with a 1,000 g load at a speed of 37 cycles per minute. The oil rubbed samples were then evaluated, where any visible removal of coating was deemed a fail.

TABLE 2

As deposited oil rub test performance of a comparative example and several examples according to the invention

| Protective coating material | As deposited oil rub test performance Thickness of protective coating | | | |
|---|---|---|---|---|
| | None | ~1 nm | ~2 nm | ~5 nm | ~10 nm |
| Comparative Example 1: None | Fail | | | | |
| Example 1: $SiO_2$:9 wt % $Al_2O_3$ | | Pass | Pass | Pass | Pass |
| Example 2: $ZrO_2$ | | | Pass | Fail | Pass |
| Example 3: $Si_3N_4$:Al | | | Pass | Pass | Pass |
| Example 4: $NiCr_xO_y$ | | | Fail | Pass | Pass |
| Example 5: $TiO_2$ | | | Fail | Fail | Fail |

The Examples in Table 2 that passed the oil rub test were remade, subjected to a toughening simulation (by heating in a furnace to 650° C. for a 5.5 minute hold for 6 mm thick glass) and then exposed to the oil rub test. All of these Examples passed, showing that they retain their durability after toughening.

Table 2 illustrates that protective coatings of either $SiO_2$:Al or $Si_3N_4$:Al provide excellent durability performance in the oil rub test. $ZrO_2$ and $NiCr_xO_y$ both afford the necessary durability depending on the thickness of the protective coating.

Protective coatings such as $SiO_2$:Al and $ZrO_2$ perform well at thicknesses of 2 nm or less which makes them useful in terms of having minimal disruption on the desired optical thickness of the UV reflective coating. However, protective coatings of $Si_3N_4$:Al, $ZrO_2$ or $NiCr_xO_y$, could all affect the ability of the glazing to minimise bird collisions since they reduce the contrast ratio between the UV reflective coating stripe and the uncoated glass, by reducing the reflectance of the stripe and increasing the reflectance of the otherwise uncoated area. Thin $SiO_2$:Al does not exhibit this disadvantage because, as shown in FIG. 2 and discussed above, it barely alters the reflectance of the coated or uncoated regions.

The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A glazing for minimising bird collisions with glazings, wherein the glazing comprises at least one substrate comprising a first major surface,
   wherein the first major surface comprises one or more first regions and one or more second regions,
   wherein the one or more first regions are coated with a UV reflective coating and the UV reflective coating of the one or more first regions has a thickness of at least 5 nm,
   wherein the one or more second regions are at least partially coated with the UV reflective coating and the UV reflective coating of the one or more second regions has a thickness of less than 5 nm or wherein the UV reflective coating is completely absent in the one or more second regions,
   wherein the UV reflective coating is coated with a protective coating,
   wherein any regions of the first major surface where the UV reflective coating is absent are coated with the protective coating,
   wherein the protective coating is based on an oxide or nitride of a metalloid or an oxide or nitride of a metal, and
   wherein the protective coating has a thickness of at least 0.5 nm but at most 15 nm.

2. The glazing according to claim 1, wherein the protective coating is not overcoated.

3. The glazing according to claim 1, wherein the protective coating directly contacts the UV reflective coating.

4. The glazing according to claim 1, wherein the UV reflective coating directly contacts the first major surface of the substrate.

5. The glazing according to claim 1, wherein an antireflection layer is located between the UV reflective coating and the first major surface of the substrate.

6. The glazing according to claim 1, wherein the one or more second regions are at least partially coated with the UV reflective coating and the UV reflective coating has a thickness of less than 4.7 nm.

7. The glazing according to claim 1, wherein the protective coating is based on a material that is different to the material that the UV reflective coating is based on.

8. The glazing according to claim 1, wherein the protective coating is based on silicon dioxide, zirconium oxide, silicon nitride and/or nickel chromium oxide.

9. The glazing according to claim 1, wherein the protective coating is based on silicon dioxide and/or silicon nitride.

10. The glazing according to claim 1, wherein the protective coating has a thickness of at least 1 nm, but at most 10 nm.

11. The glazing according to claim 1, wherein the UV reflective coating is based on an oxide and/or nitride of one or more of titanium, vanadium, chromium, zirconium, niobium, tantalum, hafnium and tungsten.

12. The glazing according to claim 1, wherein the UV reflective coating defines a patterned arrangement on the first major surface.

13. The glazing according to claim 12, wherein the patterned arrangement comprises a plurality of stripes.

14. The glazing according to claim 13, wherein at least one of the stripes has a thickness that changes by 10 nm or less over every 1 mm in width.

15. The glazing according to claim 1, wherein the UV reflective coating of the one or more first regions has a thickness of at least 10 nm, but at most 100 nm.

16. The glazing according to claim 1, wherein the at least one substrate is a glass substrate or a polymeric substrate.

17. The glazing according to claim 1, wherein the UV reflective coating and/or the protective coating have been deposited via sputtering.

18. The glazing according to claim 1, wherein the glazing comprises at least one glass substrate comprising a first major surface,
   wherein the first major surface comprises one or more first regions and one or more second regions,
   wherein the one or more first regions are coated with a UV reflective coating and the UV reflective coating has a thickness of at least 10 nm but at most 50 nm,
   wherein the one or more second regions are at least partially coated with the UV reflective coating and the UV reflective coating has a thickness of less than 4.7 nm, or
   wherein the UV reflective coating is completely absent in the one or more second regions,
   wherein the UV reflective coating is coated with a protective coating,
   wherein the protective coating directly contacts the UV reflective coating,
   wherein, if present, any regions of the first major surface where the UV reflective coating is absent are coated with the protective coating and the protective coating directly contacts the regions of the first major surface where the UV reflective coating is absent,
   wherein the protective coating is based on an oxide of silicon, and
   wherein the UV reflective coating is based on titanium dioxide.

19. A glazing for minimising bird collisions with glazings, wherein the glazing comprises at least one substrate comprising a first major surface,
   wherein the first major surface comprises one or more first regions and one or more second regions,
   wherein the one or more first regions are coated with a UV reflective coating and the UV reflective coating of the one or more first regions has a thickness of at least 5 nm,
   wherein the one or more second regions are at least partially coated with the UV reflective coating and the UV reflective coating of the one or more second regions has a thickness of less than 5 nm or wherein the UV reflective coating is completely absent in the one or more second regions, wherein the UV reflective coating is coated with a protective coating, wherein the protective coating directly contacts any regions of the first major surface where the UV reflective coating is absent, wherein the protective coating is based on an oxide or nitride of a metalloid or an oxide or nitride of a metal, and wherein the protective coating has a thickness of at least 0.5 nm but at most 15 nm.

20. A glazing for minimising bird collisions with glazings, wherein the glazing comprises at least one substrate comprising a first major surface, wherein the first major surface comprises one or more first regions and one or more second regions, wherein the one or more first regions are coated with a UV reflective coating and the UV reflective coating of the one or more first regions has a thickness of at least 5 nm, wherein the one or more second regions are at least partially coated with the UV reflective coating and the UV reflective coating of the one or more second regions has a thickness of less than 5 nm or wherein the UV reflective coating is completely absent in the one or more second regions, wherein the UV reflective coating is coated with a protective coating, wherein the protective layer is placed to overlap both at least one first region and at least one second region, wherein the protective coating is based on an oxide or nitride of a metalloid or an oxide or nitride of a metal, and wherein the protective coating has a thickness of at least 0.5 nm but at most 15 nm.

* * * * *